(12) United States Patent
Liu

(10) Patent No.: US 12,012,169 B2
(45) Date of Patent: Jun. 18, 2024

(54) FOLDABLE ROTARY ARM STRUCTURE AND DEVICE FOR BICYCLE

(71) Applicant: Pengjun Liu, Zhengzhou (CN)

(72) Inventor: Pengjun Liu, Zhengzhou (CN)

( * ) Notice: Subject to any disclaimer, the term of this patent is extended or adjusted under 35 U.S.C. 154(b) by 37 days.

(21) Appl. No.: 18/358,090

(22) Filed: Jul. 25, 2023

(65) Prior Publication Data
US 2023/0365214 A1 Nov. 16, 2023

Related U.S. Application Data

(63) Continuation of application No. PCT/CN2021/142243, filed on Dec. 29, 2021.

(51) Int. Cl.
*B62J 50/00* (2020.01)
*B62J 6/22* (2020.01)
*B62J 43/30* (2020.01)

(52) U.S. Cl.
CPC .............. *B62J 50/00* (2020.02); *B62J 6/22* (2020.02); *B62J 43/30* (2020.02)

(58) Field of Classification Search
CPC ... G01C 21/18; B62J 50/00; B62J 6/22; B62J 43/30; B62H 1/10; B62H 1/12; B62K 11/04
USPC .................................................. 280/212, 217
See application file for complete search history.

(56) References Cited

U.S. PATENT DOCUMENTS

| | | | | |
|---|---|---|---|---|
| 5,820,439 A * | 10/1998 | Hair, III | ................ | A63H 17/16 446/233 |
| 8,918,239 B2 * | 12/2014 | Kim | ...................... | B62D 61/02 180/65.265 |
| 10,689,047 B2 * | 6/2020 | Krylatov | ................ | G01C 19/06 |
| 11,027,786 B2 * | 6/2021 | Brendelson | ............ | B62D 37/06 |
| 11,046,374 B2 * | 6/2021 | Gordner | ................ | B62D 37/06 |
| 2011/0231060 A1 * | 9/2011 | Kim | ...................... | B62K 11/00 701/41 |
| 2013/0274995 A1 * | 10/2013 | Kim | ...................... | B62D 37/06 701/36 |

(Continued)

FOREIGN PATENT DOCUMENTS

| | | |
|---|---|---|
| CN | 201753096 U | 3/2011 |
| CN | 205524668 U | 8/2016 |

(Continued)

OTHER PUBLICATIONS

Internation Search Report of PCT/CN2021/142243, dated Mar. 23, 2022.

*Primary Examiner* — Tony H Winner

(57) ABSTRACT

A foldable rotary arm structure and device for a bicycle. The foldable rotary arm structure includes a rotary wheel and a rotary arm. The rotary wheel is coaxial with a transverse tube or surrounds the transverse tube. The rotary arm is in steering connection with the rotary wheel or a supporting base, such that the rotary arm is attached to the transverse tube when folded, thereby reducing the space of the transverse tube occupied in a radial direction. A flywheel for use in a balancing device of a bicycle or a motor-assisted bicycle or an amusement device is provided. In the rotary arm, individual batteries or multistage batteries are arranged in a single layer in the radial direction and are stacked in multiple stages in the axial direction. When the rotary arm is unfolded and rotated, the angular momentum is increased or the torque is balanced.

10 Claims, 13 Drawing Sheets

(56) References Cited

U.S. PATENT DOCUMENTS

| | | | |
|---|---|---|---|
| 2015/0353151 A1* | 12/2015 | Klews | B62J 45/412 |
| | | | 74/5.22 |
| 2017/0043831 A1* | 2/2017 | Zhu | B62H 7/00 |
| 2017/0363429 A1* | 12/2017 | Zhu | B62H 1/12 |
| 2020/0102043 A1 | 4/2020 | Zhang et al. | |

FOREIGN PATENT DOCUMENTS

| | | |
|---|---|---|
| CN | 109677538 A | 4/2019 |
| CN | 111874141 A | 11/2020 |

* cited by examiner

FOLDABLE ROTARY ARM STRUCTURE AND DEVICE FOR BICYCLE

CROSS-REFERENCE TO RELATED APPLICATIONS

This application is a continuation of International Patent Application No. PCT/CN2021/142243 with a filing date of Dec. 29, 2021, designating the United States, now pending, and further claims priority to Chinese Patent Application No. 202120201455.5 with a filing date of Jan. 26, 2021. The content of the aforementioned applications, including any intervening amendments thereto, are incorporated herein by reference.

TECHNICAL FIELD

A foldable rotating arm structure and device for a bicycle, which are used in the field of bicycles and power-assisted bicycles.

BACKGROUND

The unmanned bicycle, self-driving bicycles, and two-wheeled vehicles need a gyro balance device to maintain in a static state, but the space for placing the gyro device on the light bicycle frame is very limited, and the patent number CN 201753096 U is lifted to a flywheel placed on the transverse pipe, has a large volume, is inconvenient for normal riding, and is difficult to be practical. At present, CN 111874141 A discloses an electric bicycle balancing device and an electric bicycle, wherein a battery is arranged in a storage battery frame surrounding the driving motor, and the weight of the battery is used as a counterweight, which reduces the extra flywheel counterweight and has a large capacity.

SUMMARY OF THE INVENTION

However, the frame structure cannot be folded; the axis of the storage battery is parallel to the driving motor, and the radial or axial space of the occupied space cannot be effectively reduced when the battery is folded in the radial multi-layer stacking manner. Due to the arrangement mode shown, the mass is increased, but the radius is increased, the angular momentum increase amount mainly depends on the increase of the mass, the required starting torque is constant, and the method is suitable for being not portable.

A foldable rotating arm structure and device for a bicycle, comprising a rotating wheel and a rotating arm, characterized in that the rotating wheel and the crossbar are coaxial or surround the crossbar; and the rotating arm is rotatably connected to the rotating wheel or the rotating arm base, and the driving device drives the rotating wheel and the rotating arm to rotate together.

The advantages are as follows: at least one of the rotating arms is provided, and the number of the rotating wheels is at least one. The rotating arm is connected to or integrated with the rotating arm connecting base, the rotating arm or the rotating arm connecting base is connected to the support base by means of a rotating shaft, the support base is connected to or integrated with the rotating wheel, the rotating arm can be folded or unfolded manually or electrically when the rotating arm is rotated, the minimum of the rotating arm is foldable, and when the rotating arm is folded, the rotating arm is attached to the transverse pipe.

The rotating arm has the advantages that when the rotating arm is folded, the rotating arm is attached to the outer side of the transverse pipe in a surrounding mode, the space occupied by the transverse pipe in the radial direction is reduced, and the interference of manual normal riding on people is reduced.

The advantage is that the rotating arm is rod-shaped or cylindrical or tubular, and each rotating arm is separated or is flexibly connected, such as an umbrella-shaped structure of a spring or a wire or cloth, or a tail end belt counterweight device.

The present invention has the advantages that the movable wheel can rotate and linearly slide relative to the transverse pipe, and the movable wheel drives the connecting rod to be connected to the rotating arm, which has the advantages that the middle or tail end of all the rotating arms is connected to the connecting rod in a steering manner, and the optimal connecting point is in the gap between the rotating arms; and the connecting rod movably connected to one movable wheel, the centrifugal force when the rotating arm rotates, or the manual or folding motor drives the movable wheel to slide relative to the transverse pipe, so as to realize synchronous linkage folding or unfolding or steering of the plurality of rotating arms.

It has the advantage that the folding motor is connected to the transmission element on the third transmission element or the fifth transmission element or the transmission chain thereof, such as a sixth transmission element or a seventh transmission element or an eighth transmission element or a ninth transmission element. The fifth transmission element screw shaft is connected with the stroke nut, the stroke nut is connected with the rotating arm connecting base, the fifth transmission element screw shaft drives the stroke nut to move in the clamping groove of the support base, the lever rotating arm connecting base is driven, folding of the rotating arm connecting base or the rotating arm is achieved, and the rotating arm is connected with the rotating wheel or the rotating arm connecting base through the tension spring. Linkage folding or unfolding of the rotating arm or the rotating arm connecting base is achieved by means of the linkage transmission element.

The present invention has the advantages that adjacent seventh transmission elements are connected or connected by means of a ninth transmission element, a reversing synchronous wheel or a reversing column is mounted between adjacent seventh transmission elements or is connected to a lead screw shaft of a reverse wire, and adjacent transmission elements rotate synchronously in the same direction by means of a ninth transmission element, such as a synchronous belt or a hinge concave-convex winding connection or a gear connection.

The present invention has the advantage that the bottom surface of the supporting base is perpendicular to the axial of rotating wheel, so that the axial space can be reduced.

The present invention has the advantages that the folding motor or circuit or battery is placed in the rotating wheel arm or the groove at the side surface of the rotating wheel, and the battery and the folding motor can be placed in opposite grooves on the rotating wheel, thereby reducing the influence of the weight asymmetry of the rotating wheel, having a high space utilization rate and a small volume.

The invention has the advantages that the rotating arm connecting base is provided with the gear which is connected with the gear shaft on the rotating wheel, the gear shaft is parallel to the rotating wheel, every two gear shafts are vertically connected into a whole, and one speed reducing motor can drive the plurality of rotating arms.

The invention has the advantages that the rotating arm connecting base rotating shaft is connected with the fourth transmission element turbine, the fourth transmission element turbine is connected with the worm located on the inner side of the support base and perpendicular to the side face of the rotating wheel, and the linkage transmission part and the support base are spatially overlapped in the radial direction.

An advantage of the present invention is to integrate the linkage transmission component, such as the fourth transmission element, the fifth transmission element, the sixth transmission element, the seventh transmission element, the eighth transmission element, and the ninth transmission element, with the supporting base in the same radial space of the central shaft, thereby reducing the axial width of the central shaft and facilitating miniaturization.

The present invention has the advantages that the rotating wheel is located between the two transverse tube, the rotating arm or the rotating arm connecting base or the folding motor and other transmission devices are installed in the radial space where the rotating wheel coincides with the transverse tube, and the radial size of the rotating wheel device is reduced.

The present invention has the advantage that the permanent magnet rotor portion of the driving device is connected to the turntable device, and the armature stator is fixed to the central shaft.

The present invention has the advantage that the armature of the driving device is used as a rotor, and the armature rotor coil rotates together with the battery in the rotating wheel or the rotating arm to avoid the problem of line surrounding. When the armature of the driving device is used as a stator, the conductive slip ring device is added.

An advantage of the present invention is that the radius of the rotating shaft that is folded and steered away from the center of the transverse tube is equal to the sum of the radius of the transverse tube and the radius of the rotating rod arm.

The rotating arm has the advantages that when the rotating arm is folded, the rotating arm is attached to the transverse pipe, and the occupied height space in the radial direction of the transverse pipe is reduced.

The rotating arm has the advantages that the radius of the mass center becomes larger when the rotating arm is unfolded, larger angular momentum or balance torque can be generated by using the rotating arm with the same mass during rotation, the rotating arm is parallel to the transverse tube during folding, the radius of the mass center is small, the torque is small, and rapid starting of the rotating motor is facilitated.

The present invention has the advantages that a single battery or a multi-stage battery is arranged in the rotating arm in a radial single layer, and the total height of all the batteries is equal to the outer diameter of a single battery when the rotating arm is completely unfolded; when the rotating arm is completely unfolded, the total height of the battery is the high sum of the multi-stage batteries arranged in a single layer, the angular momentum or the balancing torque is increased during rotation, the rotating arm is parallel to the transverse tube during folding, the mass center radius is small, the torque is small, and the rotating motor is conveniently and rapidly started.

The present invention has the advantages that the tail end of the rotating arm or the rotating arm is provided with the indicating lamp, so that the safety distance can be prompted and the attractiveness can be improved under dark light.

DETAILED DESCRIPTION OF THE INVENTION

Figure 1:
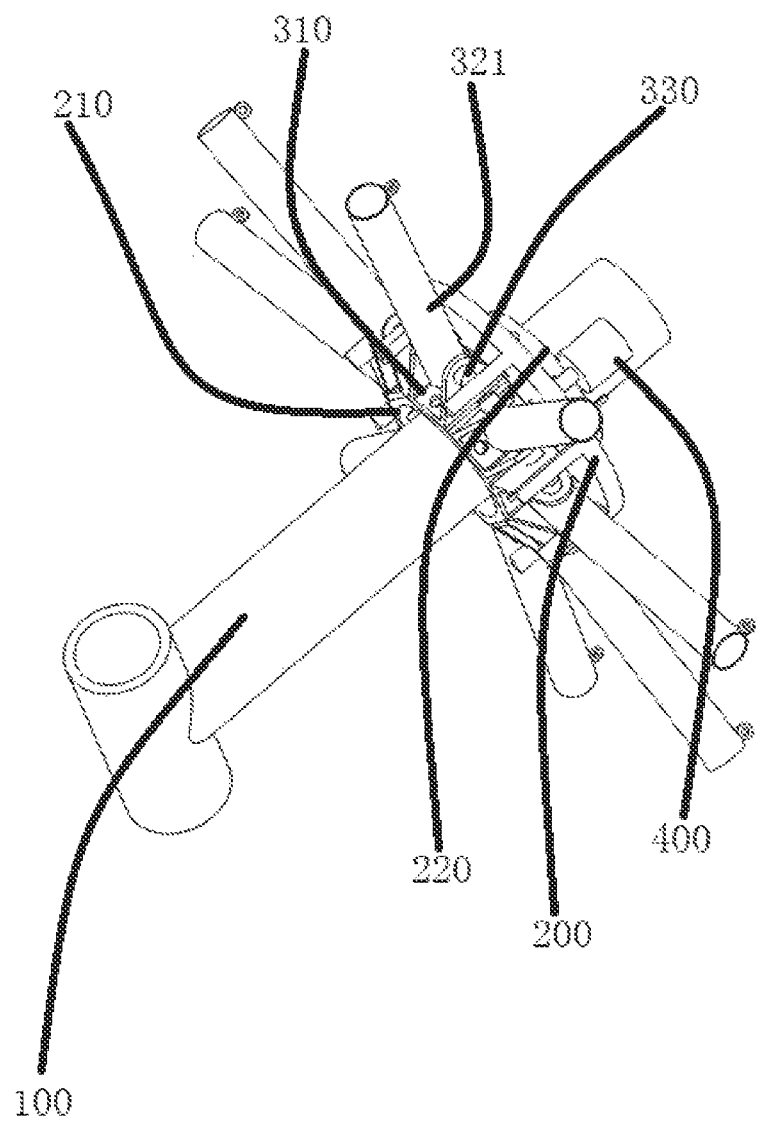
FIG. 1 shows a schematic diagram of foldable rotating arm structure and device for a bicycle according to Example 1.

As shown in FIG. 1, a foldable rotating wheel structure and device for a bicycle, comprising a transverse tube 100, a rotating wheel 200, a supporting base 310, wherein a boss 210 of the rotating arm 321 rotating wheel 200 is connected to the supporting base 310, the rotating shaft 330 passes through the tail end of the rotating arm 321 and a hole of the supporting base 310, the rotating arm 321 is rotatably connected to the supporting base 310 and the rotating shaft 330, and when the rotating arm 321 is folded, each rotating arm 321 fits the transverse tube 100, and the rotating arm 321 is perpendicular to the transverse tube 100 when the rotating arm 321 is unfolded. Each of the rotating arms 321 may be folded or unfolded. The driving device 400 is fixedly connected to the transverse tube 100 or the frame, and the output shaft of the driving device 400 is connected to the transmission element 220 on the rotating wheel 200 to drive the rotating wheel 200 and the rotating arm 321 to rotate around the transverse tube 100.

Embodiment 1, the rotating wheel 200 and the transmission element 220 may be integrated or connected in a split combination.

Figure 2:
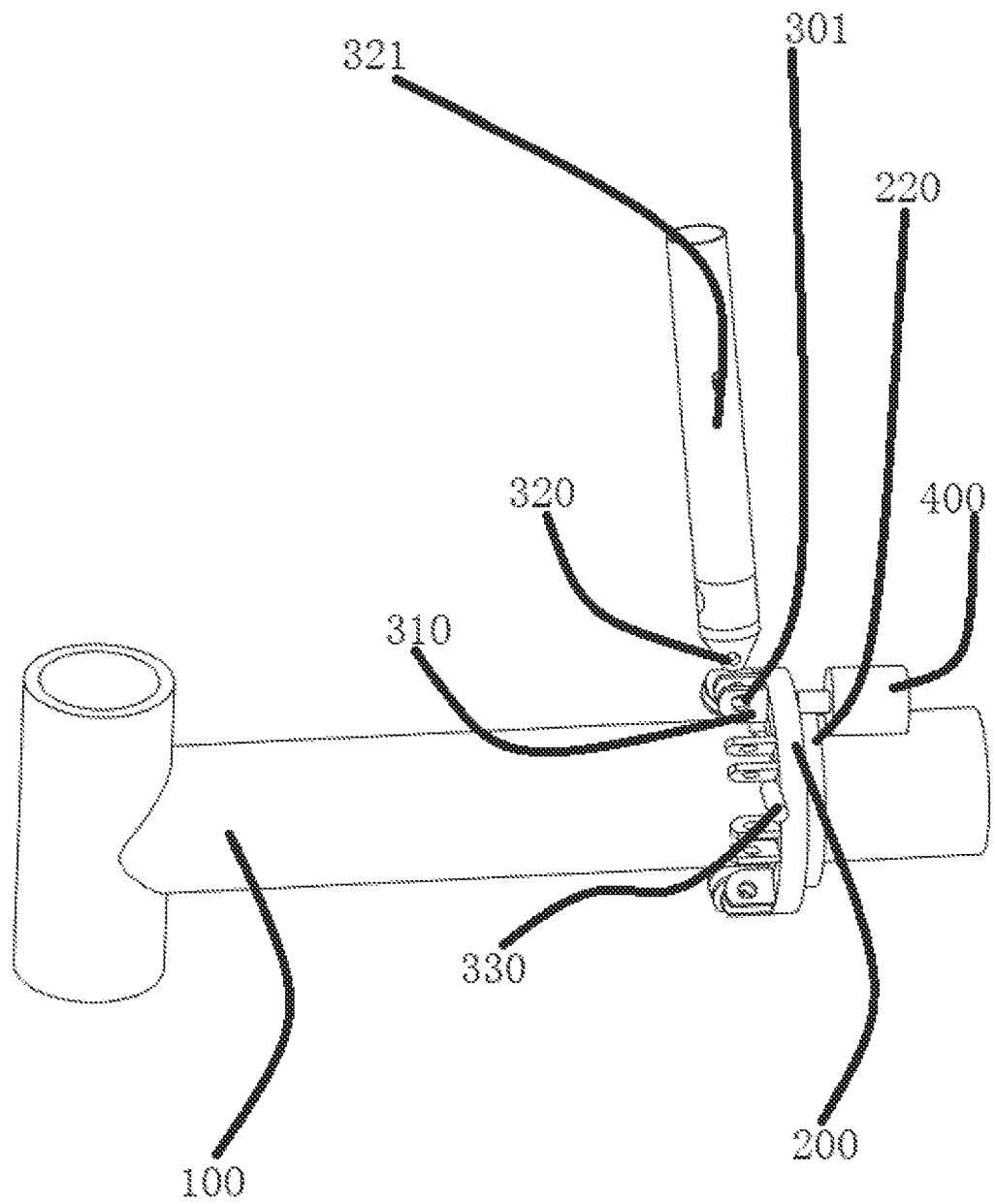
FIG. 2 shows a schematic diagram of foldable rotating arm structure and device for a bicycle according to Example 1.

Embodiment 1: The boss of the supporting base 310 and the boss of the runner 200 are as shown in FIG. 1 or the side surface of the runner as shown in FIG. 2.

EMBODIMENTS

Figure 3:
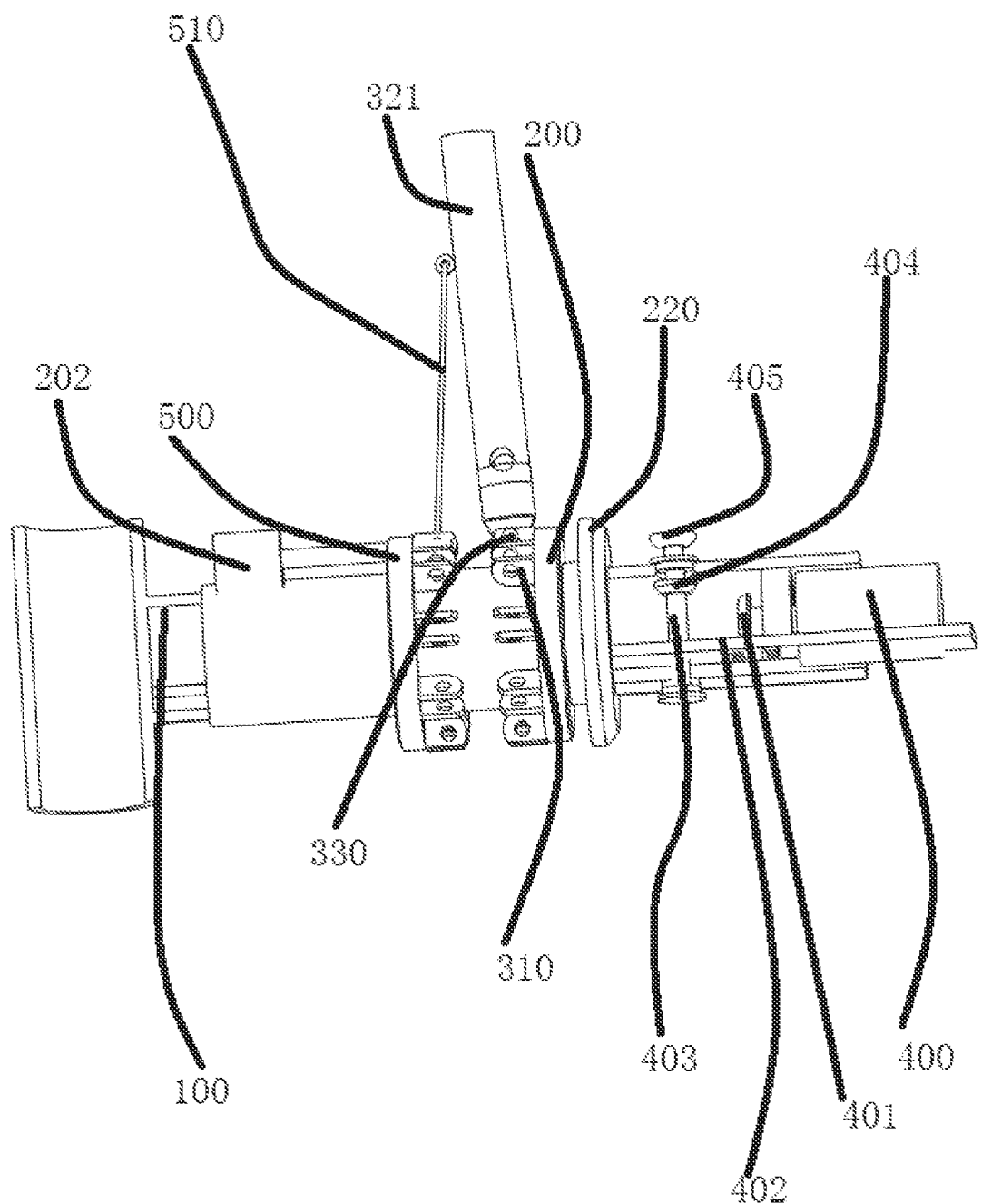
FIG. 3 shows a schematic diagram of foldable rotating arm structure and device for a bicycle according to Example 2.

As shown in FIG. 3, a foldable rotating arm structure and device for a bicycle, comprising a crossbar 100, a rotating wheel 200, a support base 310, a rotating arm 321, and a movable wheel 500, wherein the rotating wheel 200 is provided with a support base 310, the rotating shaft 330 passes through the tail end of the rotating arm 321 and the hole of the support base 310, the movable wheel 500 is movably connected to the connecting rod 510, the connecting rod 510 is movably connected to the rotating arm 321, the optimal connecting point is fixedly connected to the rotating table 220 or the rotating wheel 200, and the screw motor 202 drives the movable wheel 500 to slide relative to the rotating table 220 or the crossbar 100 During sliding, the connecting rod 510 and the rotating arm 321 are driven to rotate and fold around the rotating shaft 330 of the rotating support base 310, so that all the rotating arms 321 are synchronously folded or unfolded, the rotating arm 321 is attached to the crossbar 100 during folding, and the rotating arm 321 is perpendicular to the crossbar 100 when the rotating arm 321 is unfolded. The driving device 400 in the crossbar 100 is fixedly connected with the crossbar 100 or the frame, and the output shaft of the driving device 400 is connected with the rotating table 220 or the rotating wheel 200 through the gear 405 on the transmission shaft 403 to drive the rotating wheel 200 and the rotating arm 321 to rotate around the crossbar 100.

In Embodiment 2, the rotary table 220 and the rotary wheel 200 may be integrated, or may be a split fixed connection combination, and the rotary table 220 is rotatably connected to the crossbar 100 by means of a bearing.

In Embodiment 2, the lead screw motor 202 is located between two adjacent rotating arms 321, and the lead screw on the output shaft of the lead screw motor 202 is connected to the nut hole in the movable wheel 500. In an embodiment, the lead screw motor 202 may be replaced with a spring.

The outer diameter of the flange 102 is equal to or smaller than the outer diameter of the transverse pipe 100 and is connected with the transverse pipe 100 through a fastener, and the central shaft 103 is connected with the transverse pipe 110. The rotor part of the driving device 400 is provided with a mounting hole connected with the rotating wheel 200 through a fastener to drive the rotating wheel 200 and the rotating arm 321 to rotate relative to the transverse pipe 100. The rotating wheel 200 is connected to the base support 210, or the boss 230 of the base support 210 is connected to the rotating wheel 200, a mounting hole corresponding to the support base 310 is provided on the base support 210, and is connected to the base support 310 by means of a fastener, and the base support 210 is rotatably connected to the central shaft 103 by means of the bearing 211. The pin shaft 330 passes through a shaft hole of the rotating arm connecting base 320 and the supporting base 310, a clamping groove 311 is provided at the joint of the base supporting 310 and the stroke nut 312, two ends of the stroke nut 312 are clamped in the clamping grooves 311 on both sides of the supporting base 310, the fifth transmission element 205 lead screw shaft is connected to the stroke nut 312 in the middle of the rotating arm connecting base 320, and the other end of the fifth transmission element 205 lead screw shaft is connected to the sixth transmission element 206 or the seventh transmission element 207, and is fixed or integrated by a fastener. The output shaft of the folding motor 202 or the screw shaft of the fifth transmission element 205 is rotatably connected to the corresponding supporting groove on the rotating wheel 200 through the side surface of the supporting base 310. The rotating arm connecting base 320 and the supporting base 310 can be connected by a tension spring. The folding motor 202 is located at a portion of the groove 201 of the rotating wheel 200, a third transmission element 203 on an output shaft of the folding motor 202 is connected to the sixth transmission element 206, such as a synchronous wheel or a gear, and the seventh transmission element 207 is connected to the ninth transmission element 209, or through a synchronous belt or a hinge or a gear. The folding motor 202 rotates through the sixth transmission element 206 driven by the third transmission element 203, so as to drive the seventh transmission element 207 connected with the lead screw shaft of the fifth transmission element 205 to rotate, thereby driving the ninth transmission element 209 to rotate, the ninth transmission element 209 drives the other seventh transmission element 207 connected thereto to rotate, and the driven seventh transmission element 207 drives the fifth transmission element 205 connected thereto to rotate synchronously. The fifth transmission element 205 drives the stroke nut 312 matched with the lead screw shaft of the fifth transmission element 205 to move forwards and backwards, and the stroke nut 312 moves back and forth and drives one end of the rotating arm connecting base 320 through the lever principle, so that the other end of the rotating arm connecting base 320 is unfolded or folded. The effect that one motor drives the plurality of rotating arms 321 or the rotating arm connecting base 320 to be folded is achieved.

Figure 4:
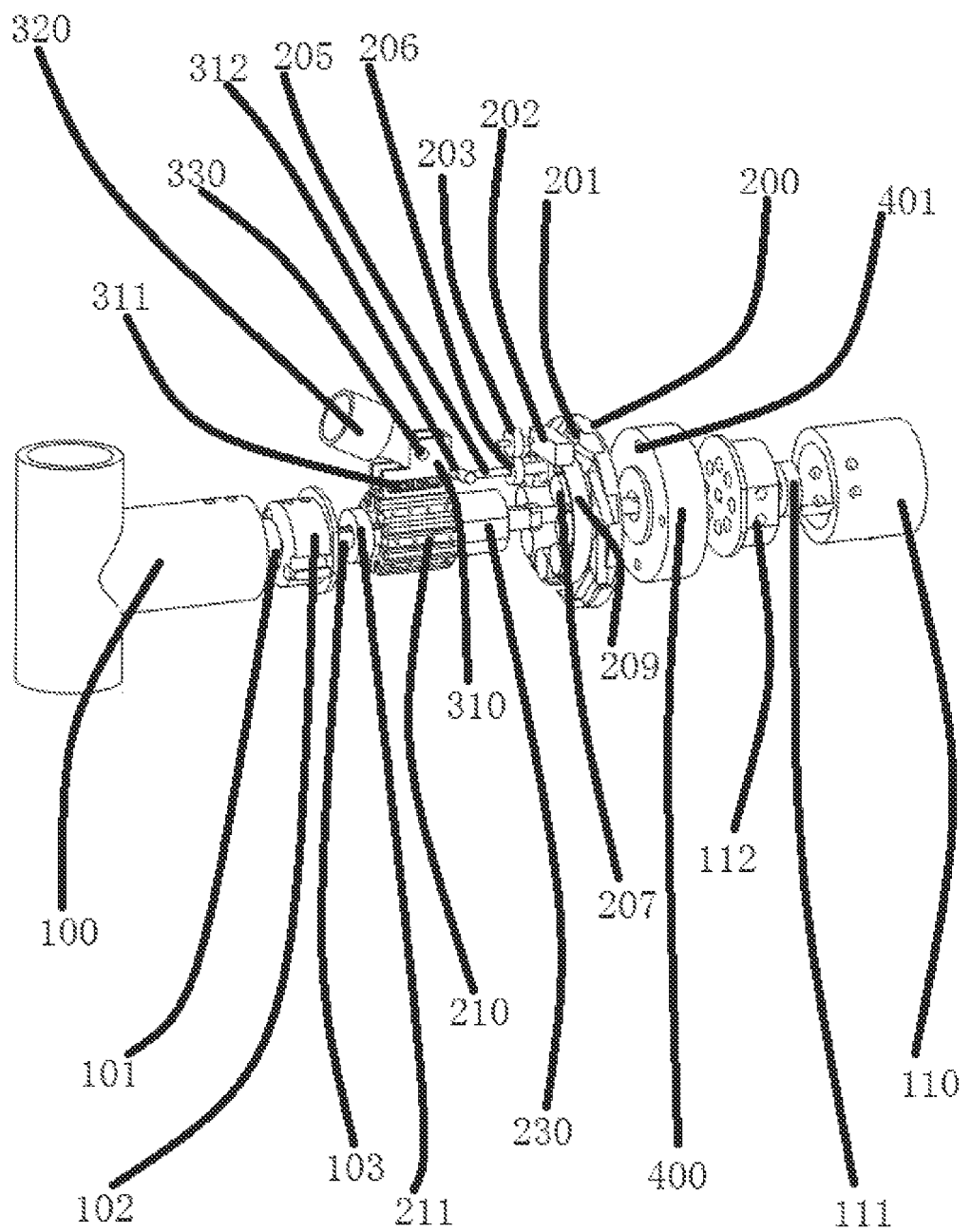
FIG. 4 shows a schematic diagram of foldable rotating arm structure and device for a bicycle according to Example 3.
Figure 5:
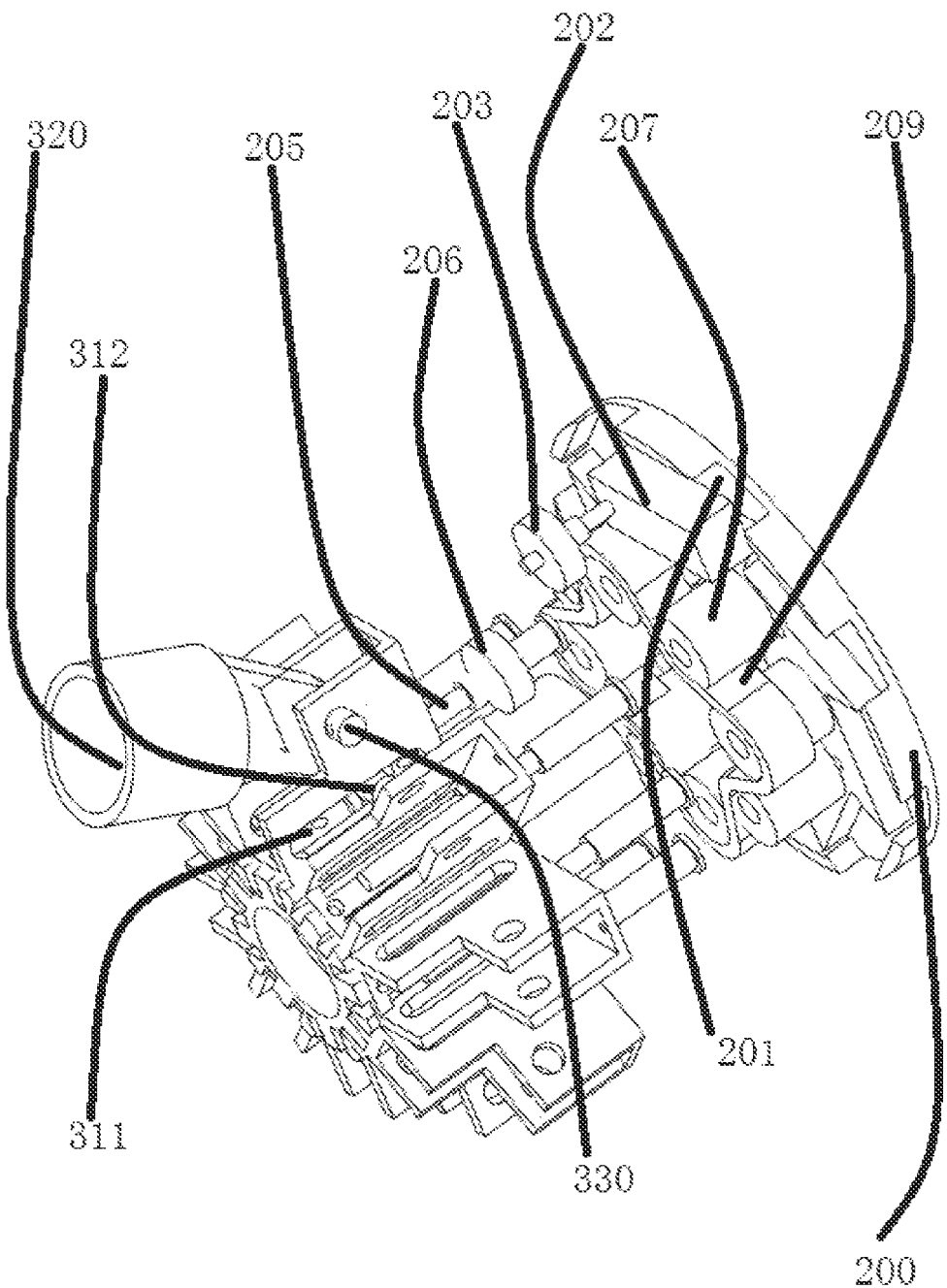
FIG. 5 shows a schematic diagram of foldable rotating arm structure and device for a bicycle according to Example 3.
Figure 6:
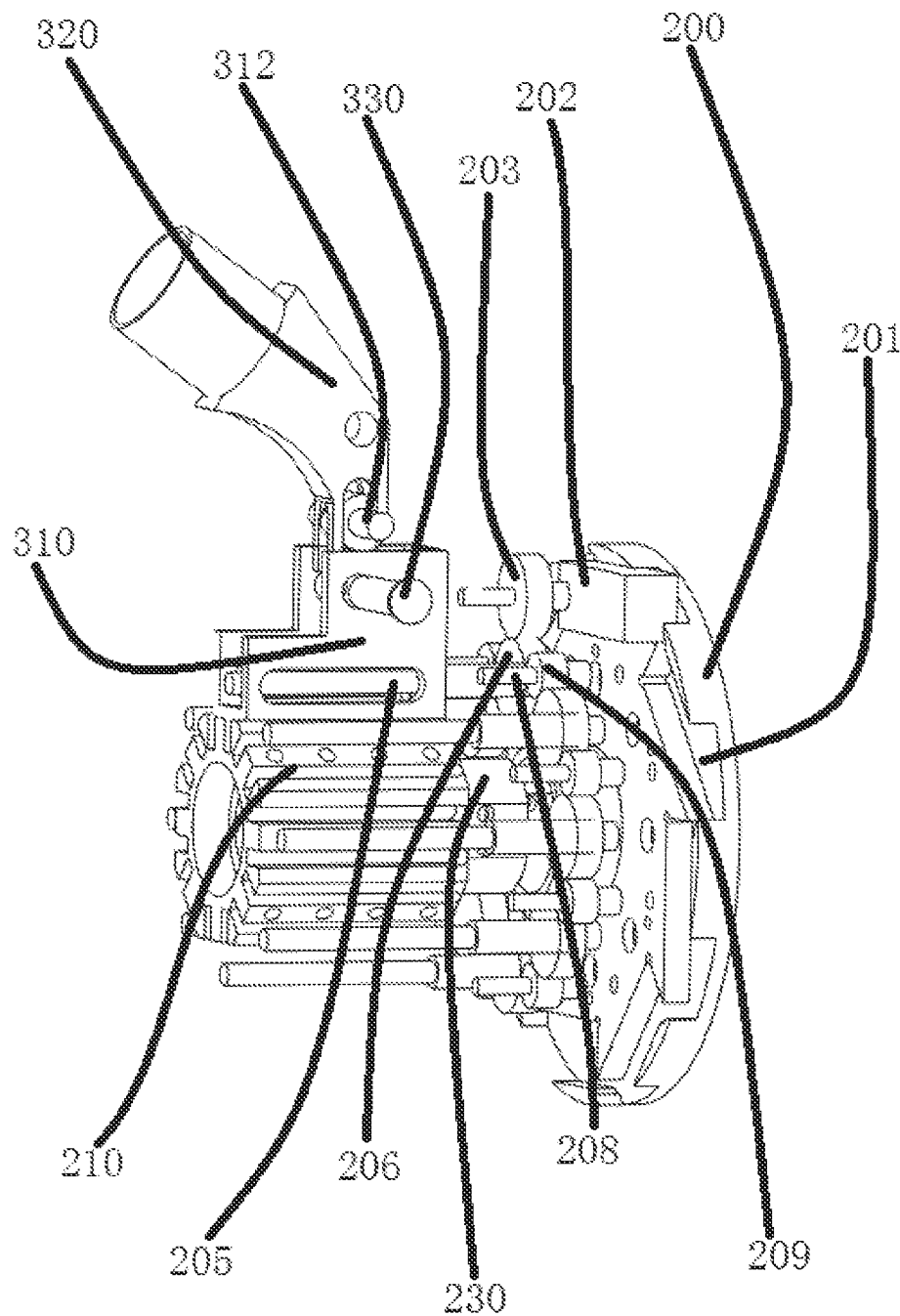
FIG. 6 shows a schematic diagram of foldable rotating arm structure and device for a bicycle according to Example 3.

In Embodiment 3, the seventh transmission element 207 and the ninth transmission element 209 may be a combination of a gear or a synchronous wheel or a synchronous belt. As shown in FIG. 4 and FIG. 5, in order to increase the contact area of the synchronous belt, a reverse transmission element such as a synchronous wheel or a reversing column is installed between the adjacent seventh transmission elements, or the adjacent fifth transmission element is replaced with a reverse lead screw or a reverse connection base or a reverse connection stroke nut, and then the synchronous belt is wound through the concave-convex interval of the adjacent transmission element, so that the rotation direction of the seventh transmission element can be synchronized, and the folding direction of the connection base is synchronized. The connection form of the seventh transmission element 207 and the ninth transmission element 209 in gear transmission can also be used as shown in FIG. 6.

Figure 7:
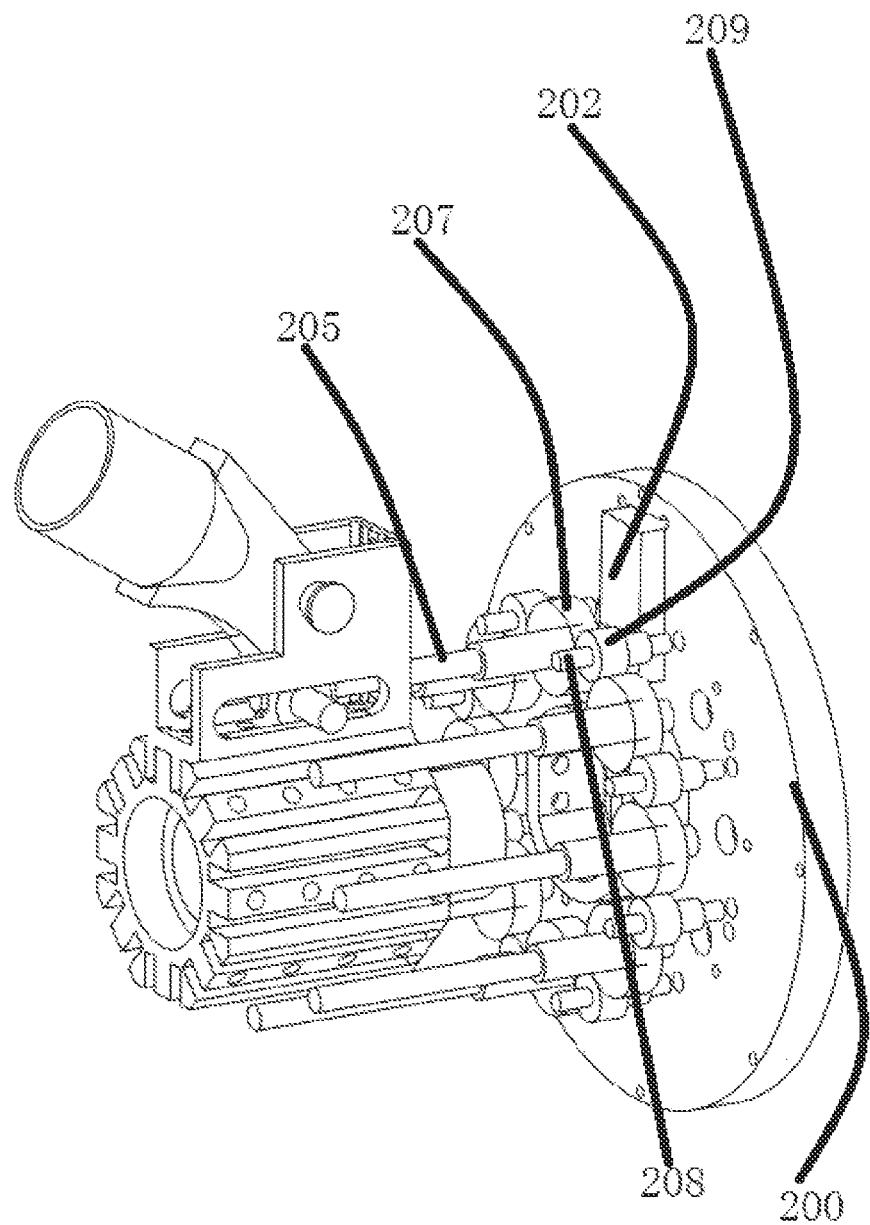
FIG. 7 shows a schematic diagram of foldable rotating arm structure and device for a bicycle according to Example 3.

In Embodiment 3, as shown in FIG. 7, the output shaft of the folding motor 202 may not pass through the transmission element 203 and the sixth transmission element 206, and is connected to the coaxial fifth transmission element 205 screw shaft or the two shafts through the coupling.

In Embodiment 3, when each fifth transmission element 205 is directly driven by the corresponding folding motor 202, the third transmission element 203, the sixth transmission element 206, and the seventh transmission element 207 and the ninth transmission element 209 in intermediate transmission are no longer needed.

Figure 9:
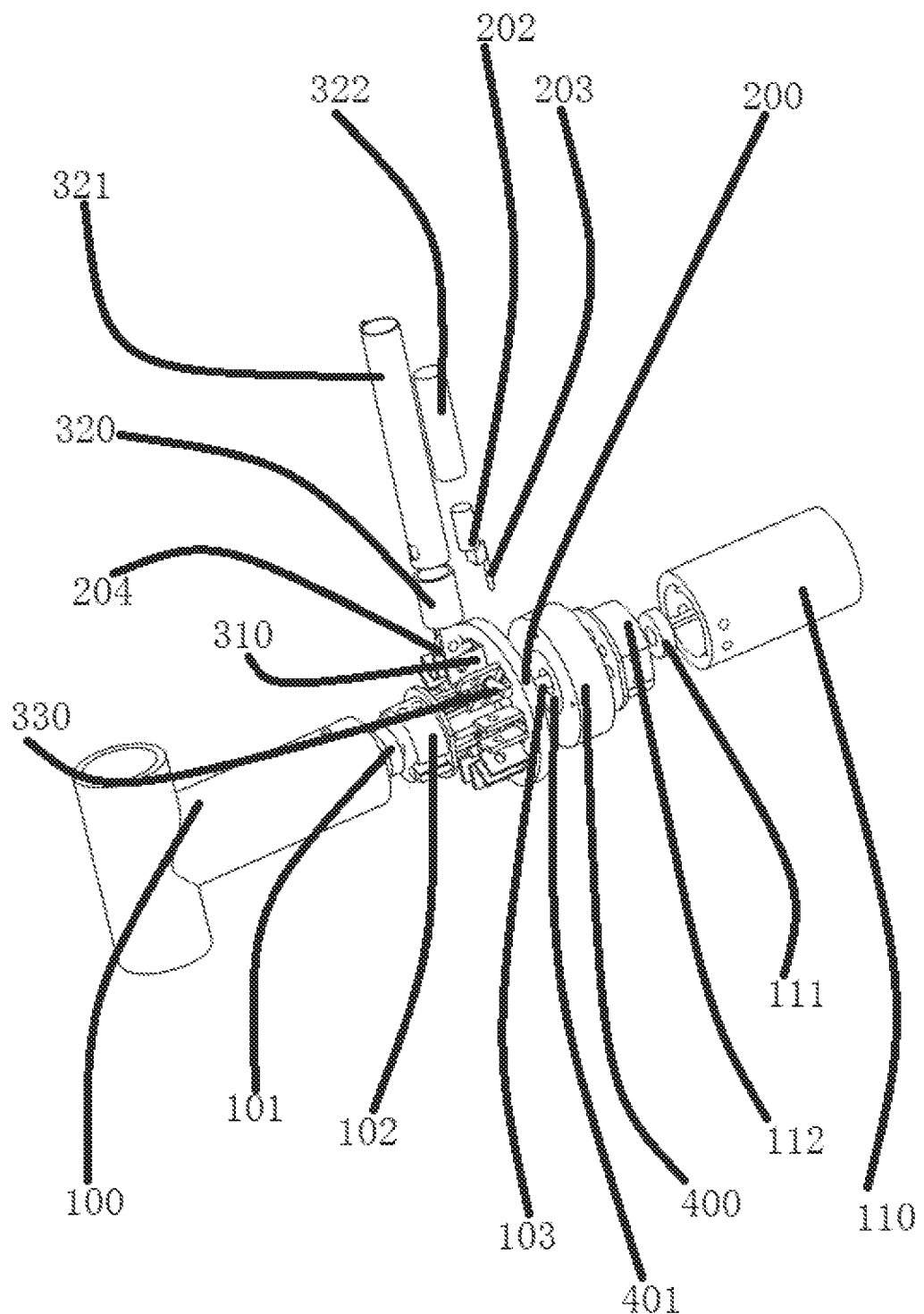
FIG. 9 shows a schematic diagram of foldable rotating arm structure and device for a bicycle according to Example 4.
Figure 10:
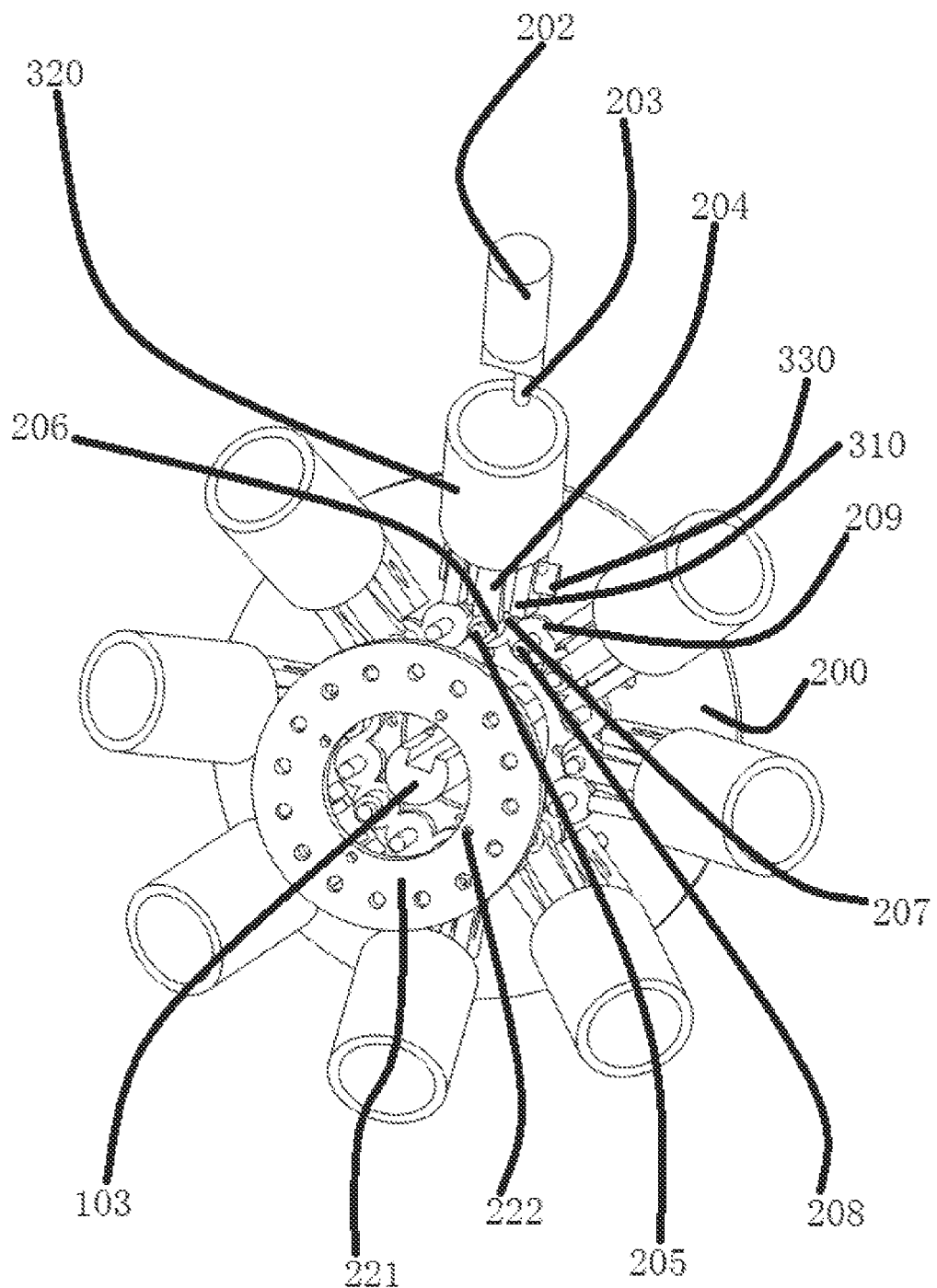
FIG. 10 shows a schematic diagram of foldable rotating arm structure and device for a bicycle according to Example 4

As shown in FIG. 9, Embodiment 4, a foldable rotating arm structure and device for a bicycle, comprising a horizontal pipe 100, a rotating wheel 200, a support base 310, a rotating arm 321, and a rotating arm connecting base 320. The stator portion of the driving device 400 is fixedly connected to the central shaft 103, the central shaft 103 is fixedly connected to the flange 102, and is fastened by a fastener 101, such as a bolt, and the flange 102 is fixedly connected to the transverse pipe 100 and is connected by means of a fastener, and the central shaft 103 is connected to the transverse pipe 110 similarly. The rotor part of the driving device 400 or the side surface of the rotor shell is provided with a mounting hole connected with the rotating wheel 200 through a fastener to drive the rotating wheel 200 and the rotating arm 321 to rotate relative to the transverse pipe 100. As shown in FIG. 10, the rotating wheel 200 is connected with the supporting base 310, the rotating shaft 330 is connected with the rotating arm connecting base 320 and the fourth transmission element 204, and the rotating shaft 330 passes through the holes of the rotating arm connecting base 320, the supporting base 310 and the fourth transmission element 204. The folding motor 202 is fixedly connected inside or outside the rotating arm connecting base 320 or the rotating arm 321, and the third transmission element 203 on the output shaft of the folding motor 202 is connected to the fourth transmission element 204, such as a worm turbine combined structure. When the folding motor 202 rotates, the fourth transmission element 204 between the third transmission element 203 and the rotating arm connecting base 320 is driven to rotate relatively, so that the fourth transmission element 204 rotates relative to the rotating arm connecting base 320 or the supporting base 310. The fourth transmission element 204 is connected to the worm portion of the sixth transmission element 206 on the other side of the rotating arm connecting base 320, the sixth transmission element 206 is a middle worm, the two ends are in an optical axis shape, the sixth transmission element 206 is connected to the seventh transmission element 207, and the sixth transmission element 206 is rotatably connected to the supporting plate 221 and the supporting groove or hole in the rotating wheel 200. The seventh transmission element 207 is connected with the ninth transmission element 209, and the eighth transmission element 208 rotating shaft passes through the ninth transmission element 209 to be connected with the supporting slotted hole in the rotating wheel 200 and the supporting plate 221. The rotating wheel 200 and the supporting plate 221 are fastened and connected by fasteners to fix and support the two rotating shafts of the sixth transmission element 206 and the eighth transmission element 208. The seventh transmission element 207 and the ninth transmission element 209 are connected between the adjacent sixth transmission elements 206, such as a gear or a synchronous belt, so as to drive the plurality of rotating arms 321 or the rotating arm connecting base 320 to be folded or unfolded in conjunction with the plurality of rotating arms 321 or the rotating arm connecting base 320 under the driving of one folding motor 202.

Figure 11:
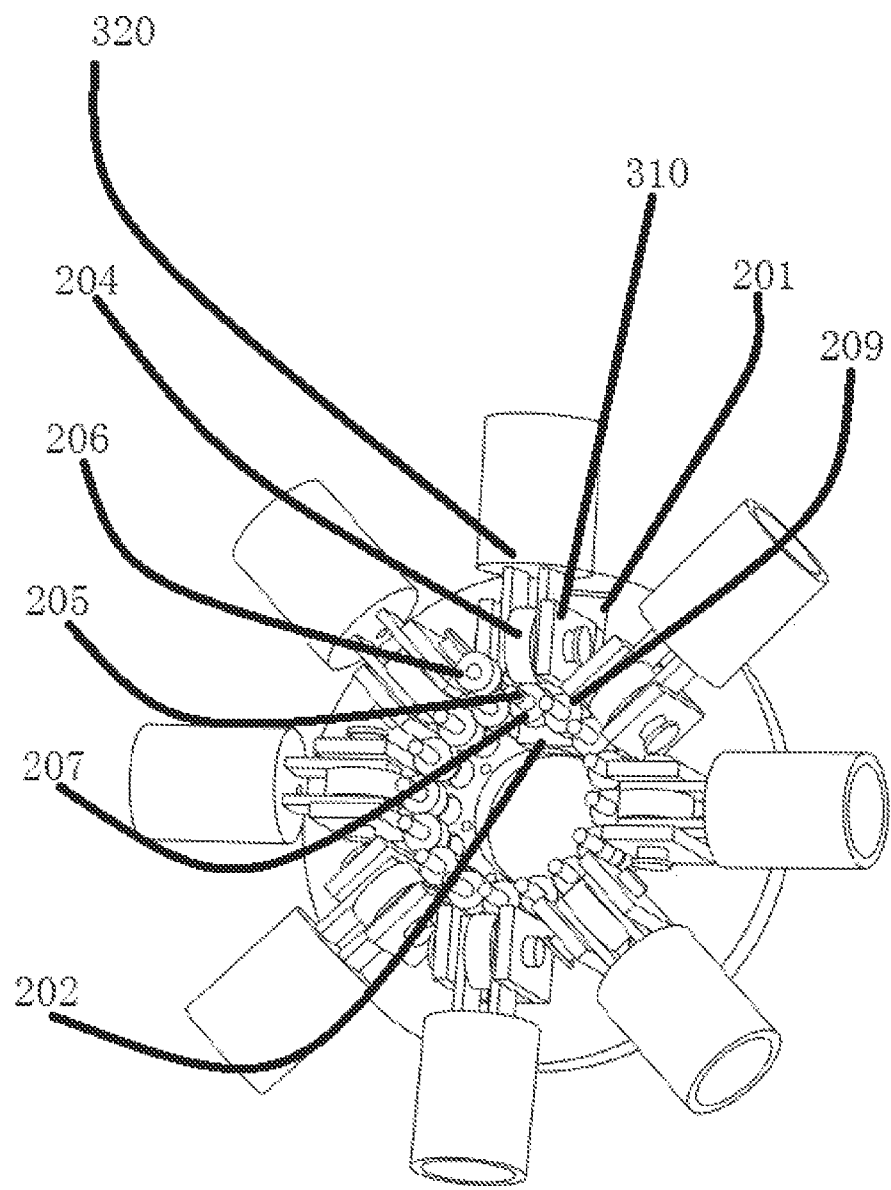
FIG. 11 shows a schematic diagram of foldable rotating arm structure and device for a bicycle according to Example 4.

As shown in FIG. 10, the sixth transmission element 206 is a middle worm, and the two ends of the sixth transmission element 206 are axially integrated, or may be combined with the worm 206 by the optical axis of the fifth transmission element 205 as shown in FIG. 11.

As shown in FIG. 10, FIG. 11, the fourth transmission element 204, the sixth transmission element 206 and the supporting base 310 are located on the same plane in the radial direction of the central shaft 103, and the space of the linkage transmission component and the supporting base 310 in the radial direction of the central shaft 103 coincide.

Figure 12:
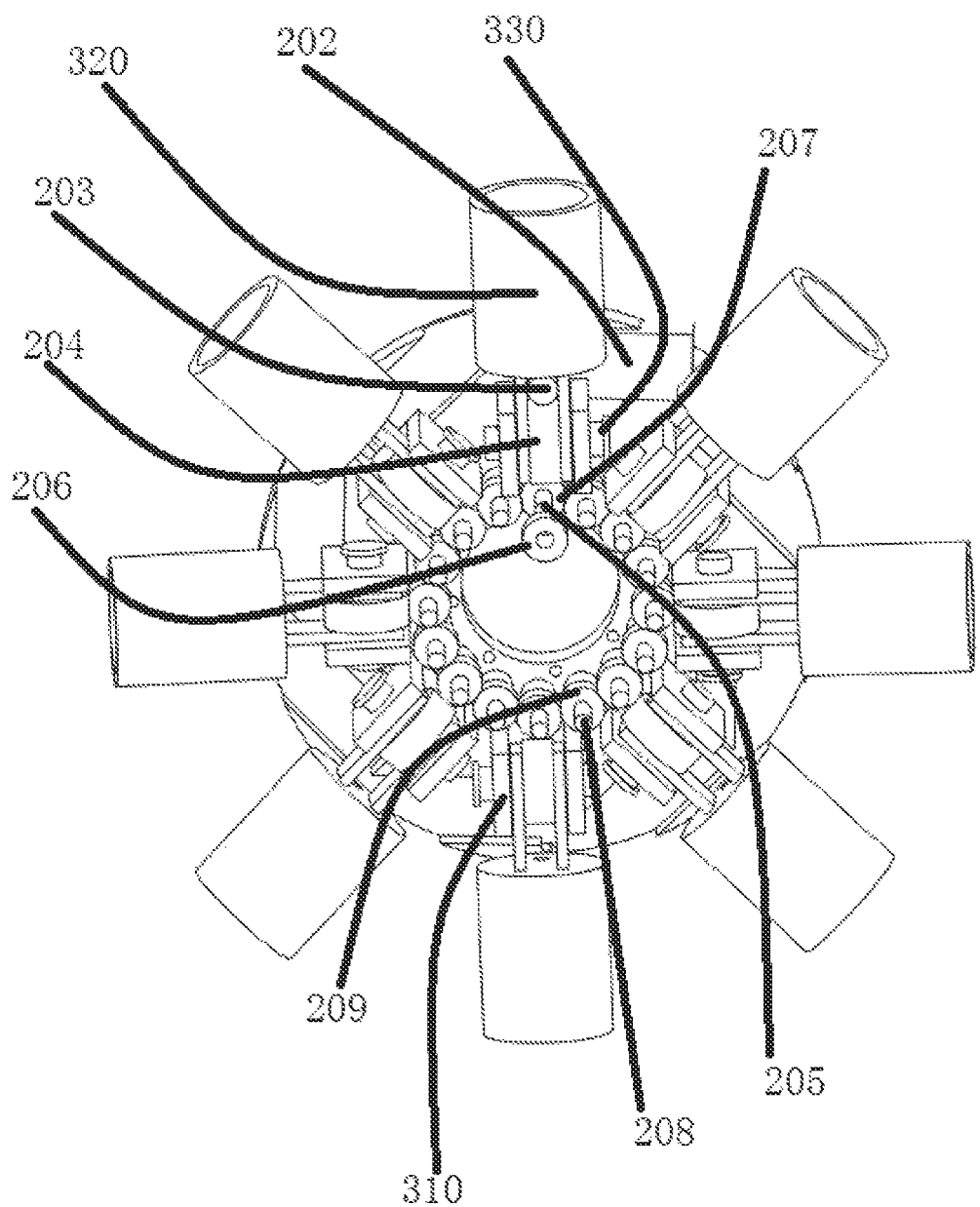
FIG. 12 shows a schematic diagram of foldable rotating arm structure and device for a bicycle according to Example 4.

In the specific implementation of Embodiment 4, the rotating arm 321 or the rotating arm connecting base 320 where the folding motor 202 is located may be fixedly connected to the support base 310 or the rotating wheel 200, or may be optimal as shown in FIG. 11, the folding motor 202 is fixedly connected to the groove of the rotating wheel 200 on the outer side of the rotating arm connecting base 320 with sufficient space, the linkage transmission element such as the pinion is more suitable for fitting on the inner side, and the third transmission element 203 on the output shaft of the folding motor 202 is connected to the fourth transmission element 204. The specific implementation may also be connected to the fifth transmission element 205 or the sixth transmission element 206 coaxially or integrally with the output shaft of the folding motor 202, as shown in FIG. 12, or coaxially connected to the seventh transmission element 207 or the eighth element 208 or the ninth element 209 on the transmission chain thereof. According to the ninth transmission element and the shaft where the intermediate transmission power is transmitted between the first transmission element and the second transmission element, the transmission is directly connected by the adjacent seventh transmission element.

In Embodiment 4, the supporting base 310 is connected to the side surface of the rotating wheel 200, the connecting base rotating shaft 330 is in gear connection with the fourth transmission element 204, the fifth transmission element 205 rotating shaft and the eighth transmission element 208 transmission shaft may be axially perpendicular to the rotating wheel 200, as shown in FIG. 10, the rotating wheel 200 may also be parallel to the rotating wheel 200 and embedded in the rotating wheel 200, and each two gear shafts are perpendicularly connected to each other to form an integrated linkage, so that one deceleration folding motor 202 drives the plurality of rotating arms 321

Embodiments 1 and 3, the base support member 210 and the rotating wheel 200 may be integrated, or may be separately connected and combined.

Figure 8:
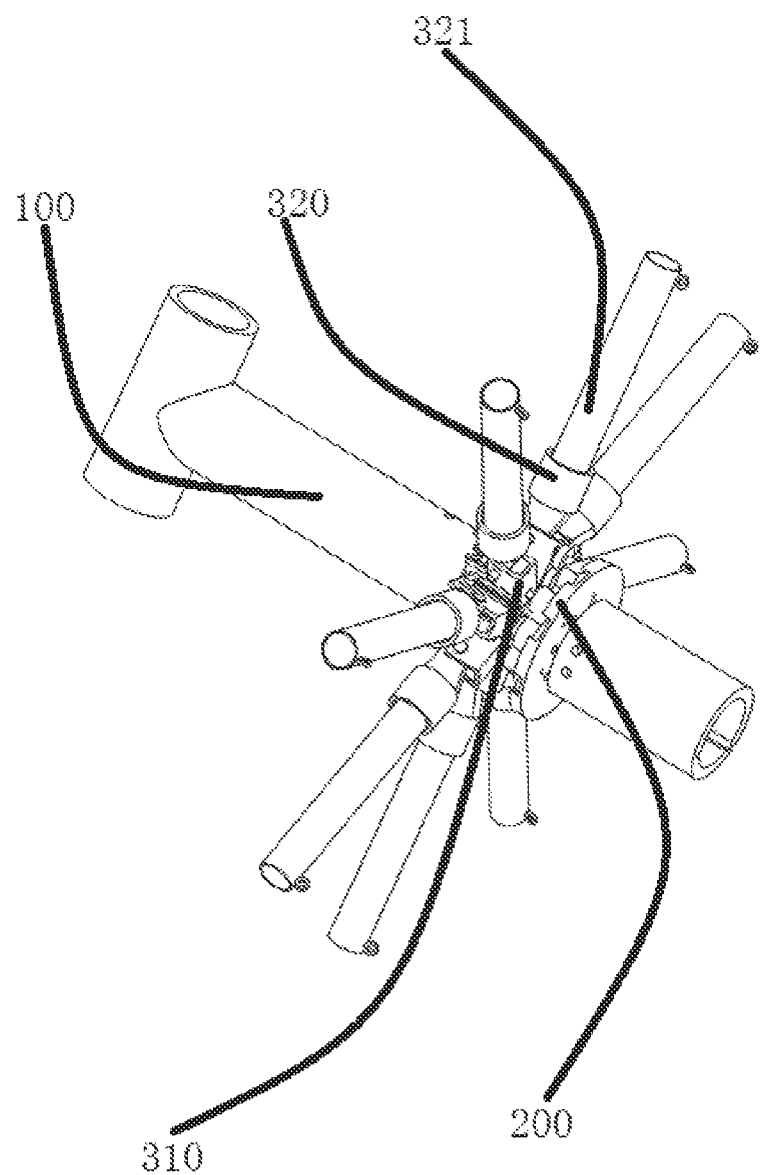
FIG. 8 shows a schematic diagram of foldable rotating arm structure and device for a bicycle according to Example 3.

In the Examples 1-4, as shown in FIG. 6 and FIG. 8, the rotating arm 321 is connected to the rotating arm connecting base 320, and may be integrated, or may be a split combined connecting structure that is convenient to expand, the rotating arm 321 may be eight, or may be symmetrically distributed, and the rotating arm 321 or the rotating arm connecting base 320 is rotatably connected to or folded with the rotating wheel 200.

In Examples 1-4, the radius of the center of mass of the rotating arm 321 becomes larger when the rotating arm 321 is unfolded, a larger angular momentum or balance moment can be generated by using the rotating arm with the same mass during rotation, the rotating arm is parallel to the transverse pipe during folding, the radius of the mass center is small, the torque is small, and rapid starting of the rotating motor is facilitated.

Figure 13:
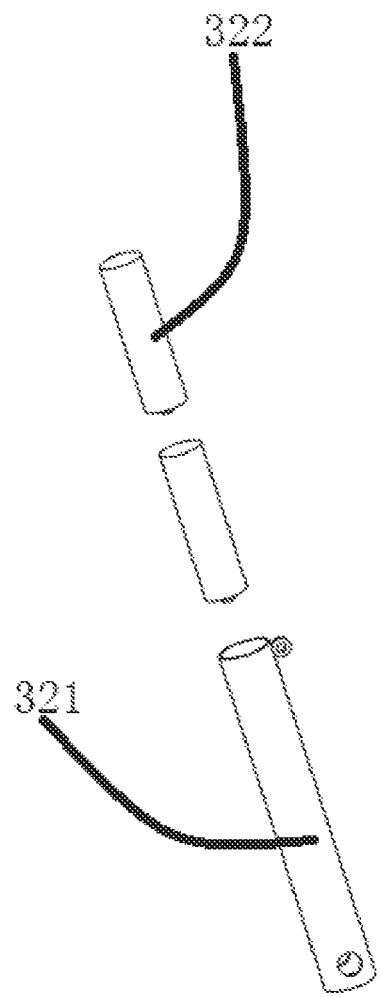
FIG. 13 shows a schematic diagram of an exploded view of the rotating arm and the battery in the axial direction of the embodiment.

As shown in FIG. 13, the rotating arm 321 is tubular or rod-shaped or cylindrical; the built-in battery 322 and the rotating arm 321 are internally provided with a single battery or a multi-stage battery in the radial single-layer arrangement of the battery, and the total height of all the batteries is equal to the outer diameter of the single battery when the rotating arm is completely unfolded; and when the rotating arm is completely unfolded, the total height of the battery is the sum of the high sum of the multi-stage single batteries, the centroid radius is improved, a larger balance moment can be generated by using the rotating arm or the battery with the same mass, and the angular momentum or the balance torque is increased during rotation. The balance device is rotated to drive the motor 400 and the folding motor 202 to supply power or to supply power to the whole vehicle.

In embodiments 1-4, the radius of the rotating shaft of the optimal rotating arm turning to the center of the transverse pipe is equal to the sum of the radius of the transverse pipe and the radius of the rotating rod arm, and the specific implementation may also be greater than or smaller than the sum of the radius of the transverse pipe and the radius of the rotating rod arm.

In Examples 1-4, the rotating arm 321 or the tail end of the rotating arm is provided with an indicator light, which can prompt a safe distance and increase aesthetics under dark light.

In embodiments 1-4, the driving device 400 is a permanent magnet synchronous motor or a hub motor or a gear motor, and can be located outside the transverse pipe, in the transverse pipe and between the transverse pipes.

In some embodiments, the armature stator is fixedly connected to the central shaft 103 or the horizontal pipe 100, the stator is stationary relative to the horizontal pipe 100, the motor rotor part of the driving device 400 is connected to the rotating wheel 200, or the permanent magnet stator of the driving device 400 is fixedly connected to the central shaft 103 or the horizontal pipe 100, and the armature rotor is connected to the rotating wheel 200 device, so that the battery 322 in the rotating arm 321 can synchronously rotate with the driving motor 400 and the driving circuit.

In embodiments 3 and 4, the rotor portion of the driving device 400 is connected to the rotating wheel 200, and may be in the transverse pipe, as shown in FIG. 6, when the outer diameter of the driving device 400 is larger than the inner diameter of the transverse pipe, the driving device 400 may also be exposed between the two transverse pipes. The optimal runner 200 may surround the radial direction of the driving device 400 to reduce the axial length. The axial direction of the folding motor 202 is parallel to the axial direction of the driving device 400, and passes through the rotating wheel 200, or may be perpendicular to the drawing In embodiments 1-4, the rotating wheel 200 is a cylindrical or regular polygonal rotating body, and may be integrated or radially or axially split.

In the embodiments 1-4, under the condition that the rotating arm 321 is longer or heavy, loosening is avoided, the number of the movable wheels 500 can be increased on the transverse pipe 100, the fixing effect is achieved when the rotating arm 321 is folded, and the movable wheel 500 or the rotating arm 321 has magnetism and is attracted to the rotating arm 321.

In embodiments 1-4, when the folding motor 202 is not folded, the rotating arm 321 can be controlled to be folded or unfolded by the centrifugal force when the rotating arm 321 is rotated manually or the rotating arm, and the rotating arm 321 is stably parked by adjusting the damping of the position of the steering rotating shaft 330.

In Examples 1-4, the rotating wheel 200 and the supporting base 310 are integrally or separately combined, and the rotating arm 321 and the supporting base 310 are symmetrically distributed.

In Examples 1-4, the driving device 400 is controlled by the access control system to drive the rotating direction and speed of the rotating wheel 200 and the rotating arm 321 to generate a balancing torque so that the vehicle body tends to be self-balancing.

What is claimed is:

1. A foldable rotating arm structure of a bicycle comprising a rotating wheel and a rotating arm, wherein the rotating wheel is coaxial with or surrounds a transverse tube; the rotating arm or rotating arm connecting base is in steering connection with the rotating wheel or support base; and driving device drives the rotating wheel and the rotating arm to rotate together.

2. The foldable rotating arm structure of the bicycle according to claim 1, wherein the rotating arm is connected to or integrated with the rotating arm connecting base, and the supporting base is connected to the rotating wheel or the supporting base and the rotating wheel are integrated.

3. The foldable rotating arm structure of the bicycle according to claim 1, wherein at least one part of the rotating arms is foldable, the rotating arm or the rotating arm connecting base is rotatably connected to the supporting base, the rotating arm is movably connected to the connecting rod, the connecting rod is rotatably connected to the movable wheel, and the movable wheel rotates or slides relative to the transverse pipe.

4. The foldable rotating arm structure of the bicycle according to claim 3, wherein the folding motor is placed in the rotating arm or on the rotating wheel or the rotating wheel boss to drive the fifth transmission element or the transmission element on the transmission chain thereof to rotate.

5. The foldable rotating arm structure of a bicycle according to claim 3, wherein the rotating wheel is located between the two transverse pipes.

6. The foldable rotating arm structure of the bicycle according to claim 1, wherein a seventh transmission element is provided on the side surface of the rotating wheel, the adjacent seventh transmission element is connected to or connected by means of the ninth transmission element to realize synchronous transmission, and the fifth transmission element coaxial with the seventh transmission element drives the stroke nut, thereby driving the rotating arm connecting base to realize linkage folding of the rotating arm connecting base or the rotating arm.

7. The foldable rotating arm structure of the bicycle according to claim 1, wherein the rotating arm connecting base is connected with the fourth transmission element, the fourth transmission element is connected with the sixth transmission element, the sixth transmission element and the seventh transmission element are connected or connected through the fifth transmission element, and the adjacent seventh transmission elements are connected or synchronously rotate through the ninth transmission element.

8. The foldable rotating arm structure of the bicycle according to claim 7, wherein the linkage transmission component coincides with the supporting base in the radial direction of the central axis.

9. The foldable rotating arm structure of a bicycle according to claim 1, wherein a single battery or a multi-stage battery in the rotating arm is arranged in a single layer in the radial direction of the battery, and is stacked in multiple stages in the axial direction.

10. The foldable rotating arm structure of a bicycle according to claim 1, wherein the rotating arm is provided with an indicator light.

* * * * *